(12) United States Patent
Somichetty et al.

(10) Patent No.: US 9,252,923 B2
(45) Date of Patent: *Feb. 2, 2016

(54) ACK-NACK SIGNALING ENHANCEMENTS (71) Applicant: Broadcom Corporation, Irvine, CA (US)

(72) Inventors: Gowrisankar Somichetty, Bangalore (IN); Sriram Rajagopal, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,806

(22) Filed: Dec. 30, 2014

(65) Prior Publication Data

US 2015/0113352 A1    Apr. 23, 2015

Related U.S. Application Data (63) Continuation of application No. 13/686,087, filed on Nov. 27, 2012, now Pat. No. 8,977,922.

(60) Provisional application No. 61/614,251, filed on Mar. 22, 2012, provisional application No. 61/727,429, filed on Nov. 16, 2012.

(51) Int. Cl.
H04L 1/18 (2006.01)
H04L 1/08 (2006.01)
H04L 1/16 (2006.01)

(52) U.S. Cl.
CPC ............ *H04L 1/08* (2013.01); *H04L 1/1635* (2013.01); *H04L 1/1864* (2013.01)

(58) Field of Classification Search
CPC ........ H04L 1/08; H04L 1/1635; H04L 1/1864
See application file for complete search history.

(56) References Cited

U.S. PATENT DOCUMENTS

| | | | | | |
|---|---|---|---|---|---|
| 6,161,207 | A  | * | 12/2000 | Lockhart et al. | 714/758 |
| 6,487,264 | B1 | * | 11/2002 | Alley et al. | 375/361 |
| 6,941,396 | B1 | * | 9/2005 | Thorpe et al. | 710/74 |
| 7,206,280 | B1 | * | 4/2007 | Khan et al. | 370/216 |
| 7,889,696 | B2 | * | 2/2011 | Choi et al. | 370/330 |
| 8,270,269 | B2 | * | 9/2012 | Mouri et al. | 369/47.48 |
| 8,737,374 | B2 | * | 5/2014 | Sambhwani | 370/342 |

* cited by examiner

*Primary Examiner* — Esaw Abraham (74) *Attorney, Agent, or Firm* — Garlick & Markison; Bruce E. Garlick (57) ABSTRACT

An ACK-NACK feedback message indicates which code words within a transport block that were received in error. The ACK-NACK message has a variable format based on the number of code words in the transport block and the number of code words received in error.

20 Claims, 7 Drawing Sheets

| Part 1 Bit Encoding | |
|---|---|
| Bit Pattern | # Code words in error |
| 00 | 0 |
| 01 | 1 |
| 10 | 2 |
| 11 | >=3 |

ACK-NACK SIGNALING ENHANCEMENTS

CROSS REFERENCE TO RELATED APPLICATIONS

The present U.S. Utility patent application claims priority pursuant to 35 U.S.C. §120 as a continuation of U.S. Utility application Ser. No. 13/686,087, entitled "ACK-NACK Signaling Enhancements", filed Nov. 27, 2012, pending, which claims priority pursuant to 35 U.S.C. §119(e) to U.S. Provisional Application No. 61/614,251, entitled "ACK-NACK Signaling Enhancements", filed Mar. 22, 2012, and U.S. Provisional Application No. 61/727,429, entitled "ACK-NACK Signaling Enhancements", filed Nov. 16, 2012, all of which are hereby incorporated herein by reference in their entireties and made part of the present U.S. Utility patent application for all purposes.

BACKGROUND OF THE INVENTION

1. Technical Field of the Invention

The invention relates generally to signaling within a communication network and more particularly to ACK-NACK signaling within a communication network.

2. Description of Related Art

In Long Term Evolution (LTE) and other 4G wireless communication systems, each data packet to be conveyed to the receiver (also referred to herein as "destination device") is made up of multiple code words, which are transmitted to the receiver in a transport block. Each code word may be provided with individual Cyclic Redundancy Check (CRC) bits and each transport block may also be provided with overall CRC bits covering all code words in the transport block.

In the existing Acknowledgment-Negative Acknowledgment (ACK-NACK) signaling, the receiver returns the overall CRC status and not the individual code word's CRC status. The transport block's ACK-NACK feedback includes only a single bit in order to minimize bandwidth requirements. However, this single bit is coded heavily to ensure that the feedback information is received by the transmitter (also referred to herein as "source device") without any error even at very low signal-to noise ratios (SNRs). For example, in UTE, the transport block's ACK-NACK after encoding may occupy about 5% of the symbol resources.

If the ACK-NACK feedback was extended to include the individual code word CRC status, each code word's ACK-NACK bit would have to be strongly coded. For example, if the number of code words in a transport block is 10, the number of resources to be used for ACK-NACK feedback would have to be increased by 10 times. In order to accommodate such a requirement, the control channel allocation would have to be increased, resulting in an inefficient usage of the bandwidth.

However, since only the overall CRC status is returned, if the receiver is unable to decode one or more of the code words in the transport block, the receiver must request retransmission of the entire transport block. For example, if the receiver is able to decode all of the code words in a transport block except one, since the transmitter is unaware of which code word was received in error, the transmitter would retransmit all of the code words in the transport block. From the retransmitted transport block, the receiver would then decode only the failed code-word.

Thus, the current ACK-NACK signaling does not inform the transmitter of which code words were received in error, so that the transmitter may re-transmit only the erroneously received code words. As such, the current ACK-NACK signaling does not efficiently utilize the bandwidth for ACK-NACK feedback and re-transmission of code words.

BRIEF SUMMARY OF THE INVENTION

The technology described herein is directed to an apparatus and methods of operation that are further described in the following Brief Description of the Drawings and the Detailed Description of the Invention. Other features and advantages will become apparent from the following detailed description made with reference to the accompanying drawings.

DETAILED DESCRIPTION OF THE INVENTION

Figure 1:
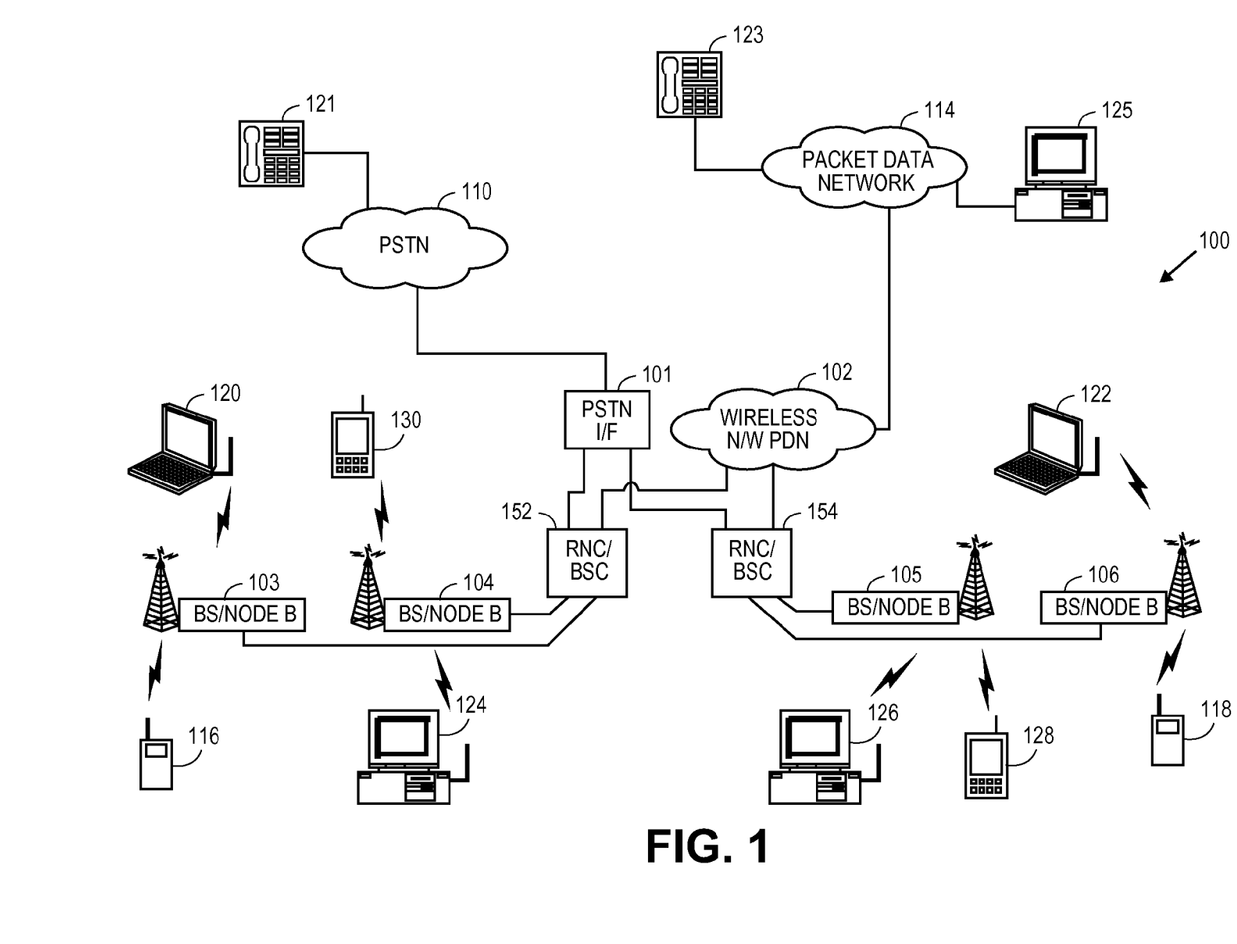
FIG. 1 is a system diagram illustrating a portion of a communication system that supports both wired and wireless terminals operating according to embodiments of the present invention.

FIG. 1 is a system diagram illustrating a portion of a communication system 100 that supports both wired and wireless terminals operating according to the present invention. The communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and Base Stations/Node Bs 103, 104, 105, and 106. The wireless network packet data network 102 couples to additional private and public packet data networks 114, e.g., the Internet, WANs, LANs, etc. A conventional voice terminal 121 couples to the PSTN 110. A Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the Base Stations/Node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The communication system 100 may also be backward compatible in supporting analog operations as well. The communication system 100 supports one or more of the Long Term Evolution (LTE) standard, LTE-Advanced (LTE-A) standard, Mobile WiMAX standard, WirelessMAN-Advanced standard, UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other OFDMA standards, CDMA standards, TDMA standards and/or FDMA standards, etc.

Wireless terminals 116, 118, 120, 122, 124, 126, 128, and 130 couple to the communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support various 4G standards, such as LTE-A and WirelessMAN-Advanced.

Figure 2:
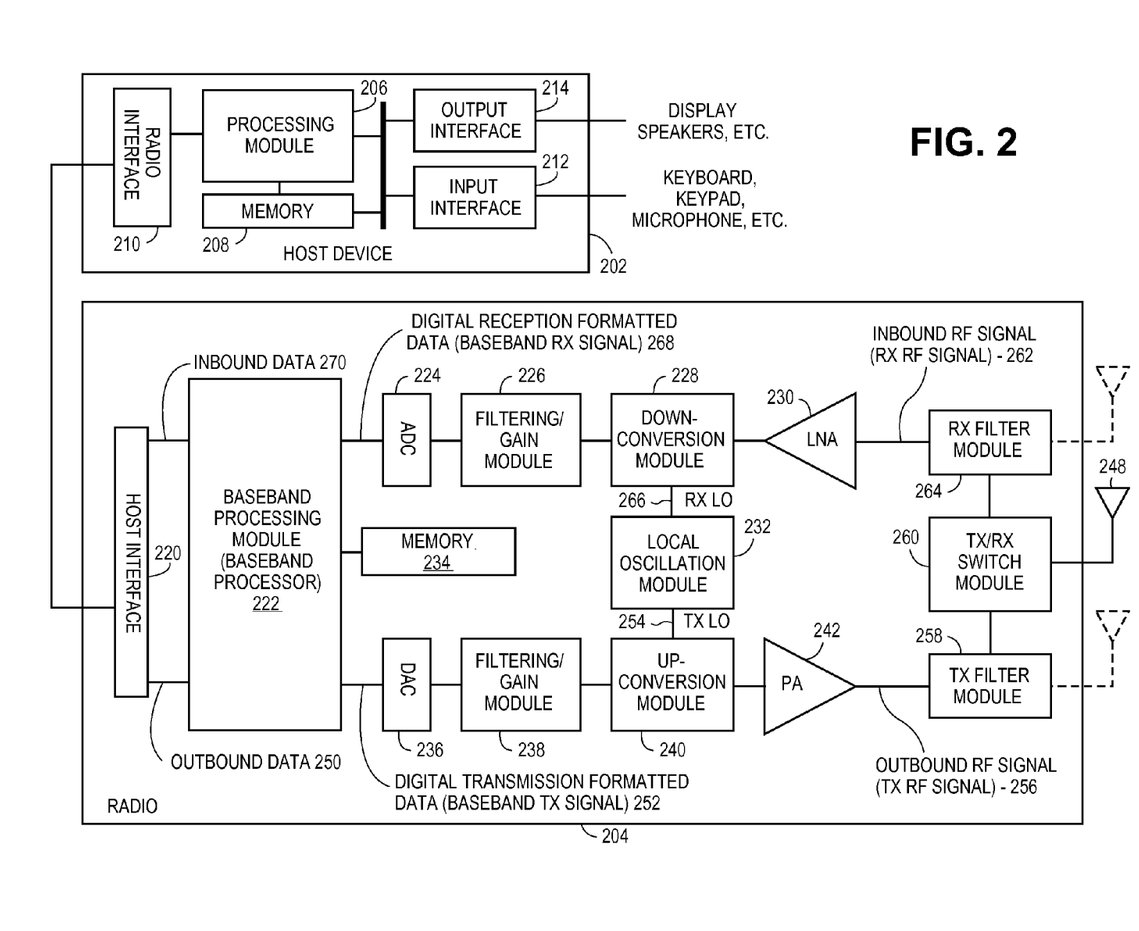
FIG. 2 is a block diagram functionally illustrating a wireless terminal constructed according to embodiments of the present invention.

FIG. 2 is a schematic block diagram illustrating a wireless terminal that includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card and, therefore, be housed separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna may further include multiple transmit and/or receive antennas to support multiple-input multiple-output technology. The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

Figure 3:
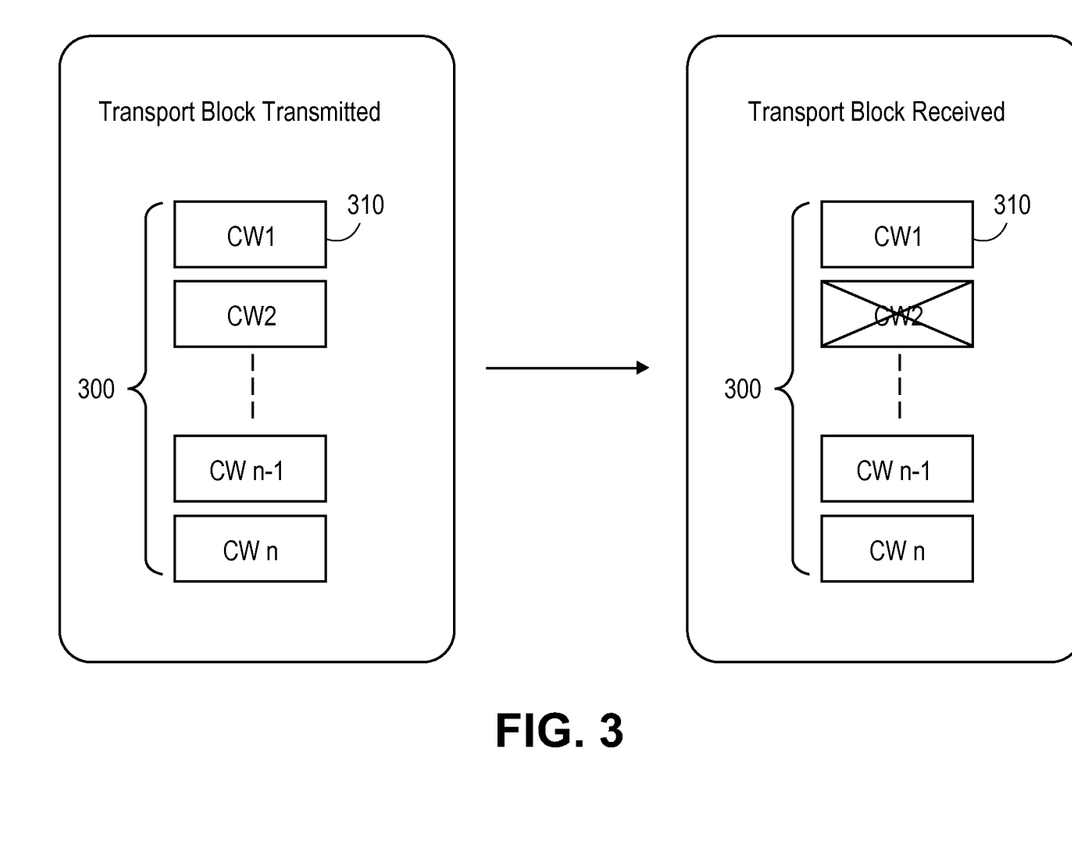
FIG. 3 illustrates transmission of a transport block including multiple code words from a transmitter ("source device") to a receiver ("destination device") according to embodiments of the present invention.

Turning now to FIG. 3, in LTE and other 4G wireless communication systems, each data packet is transmitted to the receiver in a transport block 300 made up of multiple code words 310 (CW 1, CW 2 . . . CW n−1, CW n). Each code word 310 includes Cyclic Redundancy Check (CRC) bits and each transport block 300 may also include overall CRC bits that apply to all of the code words in the transport block. The receiver uses the CRC bits to detect errors in the received code words. For example, as shown in FIG. 3, based on the CRC bits for CW 2, the receiver may determine that CW 2 is not able to be properly decoded.

Figure 4:
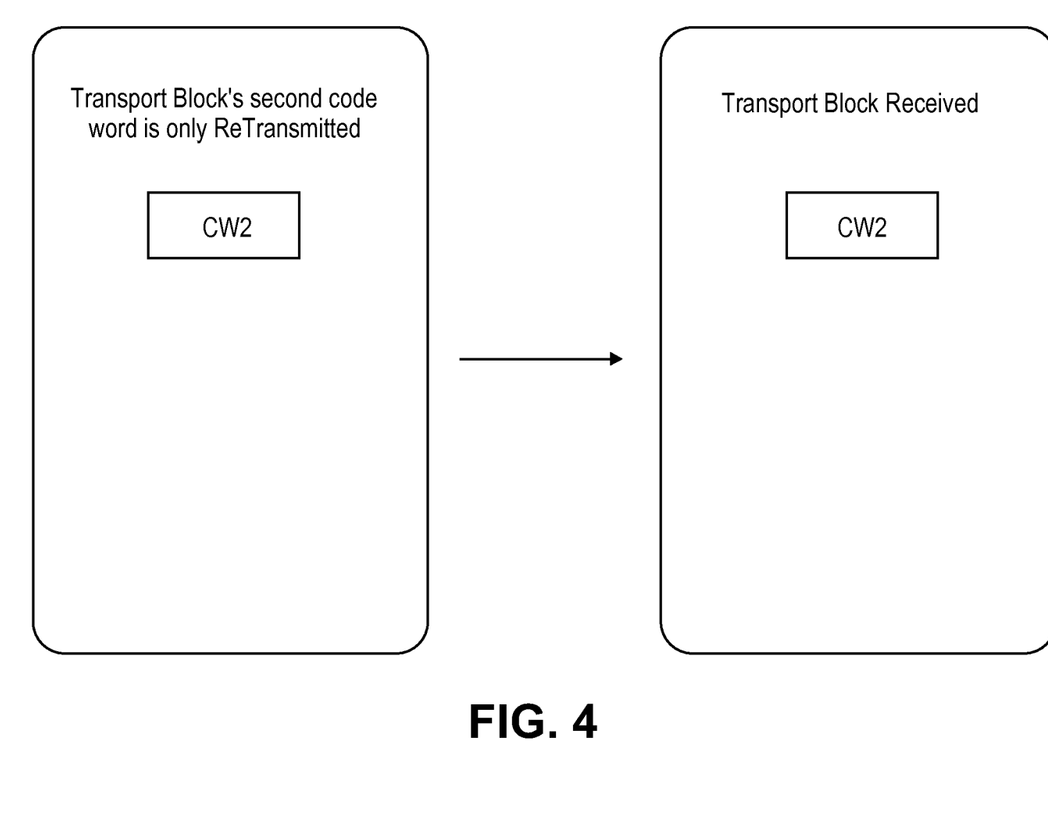
FIG. 4 illustrates retransmission of the code words received in error from the transmitter to the receiver according to embodiments of the present invention.

In accordance with various embodiments, the receiver provides ACK-NACK feedback to the transmitter that indicates that CW 2 was received in error, and therefore, should be retransmitted. As shown in FIG. 4, the transmitter can then retransmit only CW 2, instead of the entire transport block, to the receiver to enable the receiver to decode CW 2.

Figure 5:
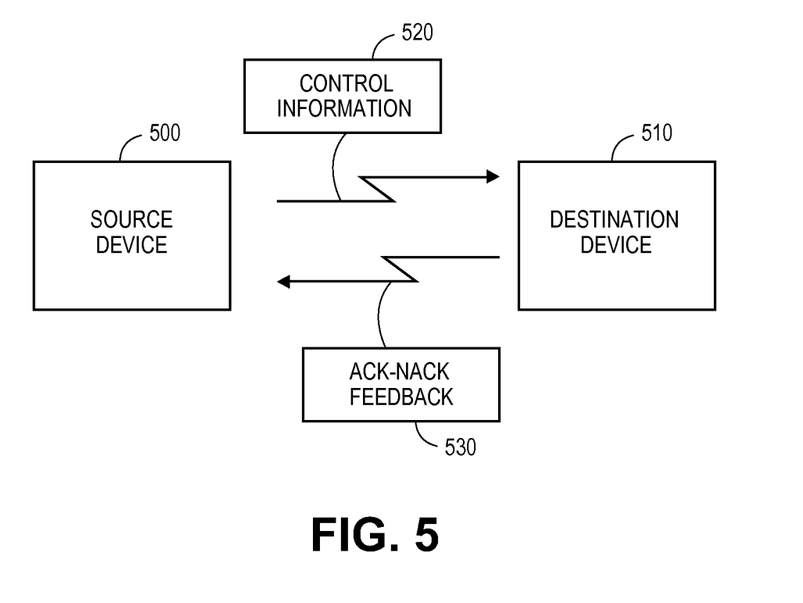
FIG. 5 illustrates exemplary ACK-NACK signaling between a source device and a destination device according to embodiments of the present invention.

FIG. 5 illustrates an exemplary ACK-NACK signaling between a source device 500 and a destination device 510. In one embodiment, the source device 500 and destination device 510 are wireless devices (e.g., the source device may be a base station and the destination device may be a wireless terminal). In another embodiment, one or more of the source device 500 and destination device 510 may be wired devices.

The source device 500 transmits control information 520 to the destination device that indicates, for example, the number of code words that will be transmitted in a transport block. The control information 520 may also indicate whether the source device 500 will re-transmit all of the code words regardless of the number received in error or re-transmit only the code words received in error. The control information 520 may further indicate the format of ACK-NACK feedback that the receiver has to employ (if, for example, multiple feedback mechanisms are possible).

From the control information 520, the destination device 510 can determine the format of ACK-NACK feedback messages 530 to be transmitted to the source device 500. For example, if the control information 520 indicates that the source device 500 will always re-transmit all code words, the ACK-NACK feedback message 530 may include only a single bit representative of the overall CRC status of the transport block. In embodiments in which the control information 520 indicates that the source device 500 can re-transmit only the code words received in error, the format of the ACK-NACK feedback message 530 can be determined based on the number of code words within each transport block or other parameters.

In an exemplary embodiment, to effectively convey to the source device 500 which code words were received in error without requiring a separate ACK-NACK for each code word, the ACK-NACK feedback message 530 includes a certain number of bits. The minimum number of ACK-NACK bits needed to ascertain which code words were received in error can be determined based on the number of code words in a transport block (n) and the number of code words received in error (m).

For example, the part:

$$\{s_i\}_{i=0}^{m-1} (1 \leq s_i \leq n, s_i < s_{i+1}) \quad \text{(Equation 1)}$$

can be computed, which contains the m sorted code word indices that are in error. Then, one can denote:

$$\binom{x}{y} = \begin{cases} \binom{x}{y} & x \geq y \\ 0 & x < y \end{cases}, \quad \text{(Equation 2)}$$

and compute the scalar r, which is given by:

$$r = \sum_{i=0}^{m-1} \binom{n - s_i}{m - i}. \quad \text{(Equation 3)}$$

The range of r is given by:

$$r \in \left\{0, \ldots, \binom{n}{m} - 1\right\}. \quad \text{(Equation 4)}$$

Each value of r uniquely identifies which of the code words are in error. Therefore, the code words that are in error can be represented using q bits, where q is greater than or equal to:

$$\log 2(^n c_m) = \log 2\left(\frac{n!}{m!(n-m)!}\right) < n \quad \text{(Equation 5)}$$

Figure 6:
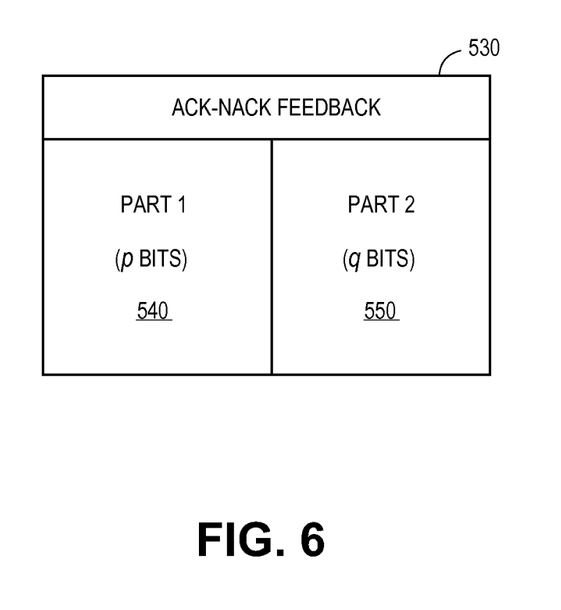
FIG. 6 illustrates an exemplary format of an ACK-NACK feedback message according to embodiments of the present invention.

In one embodiment, as shown in FIG. 6, the ACK-NACK feedback 530 includes two parts (Part-1 540 and Part-2 550). Part-1 540 includes p bits, which indicate the number of code words in error, while Part-2 550 includes q bits, which indicate the particular code words that were received in error. In an exemplary embodiment, the p bits are strongly coded to ensure they are received error-free, while the q bits are weakly coded to reduce bandwidth usage. In this embodiment, if the transmitter is unable to decode the second part (q bits), the transmitter can retransmit all code words in the transport block.

Figure 7:
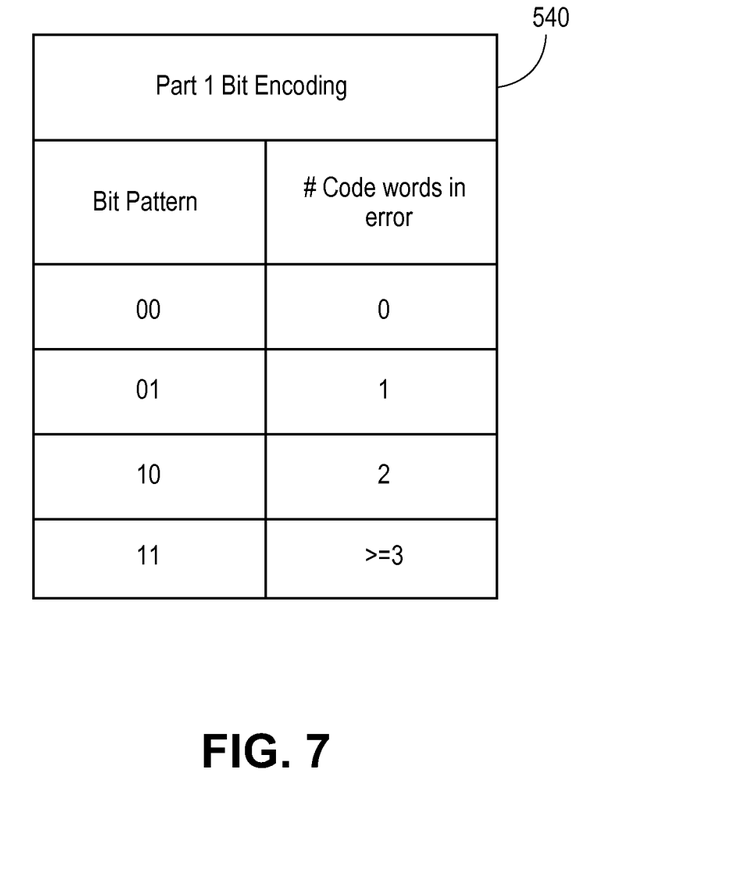
FIG. 7 illustrates exemplary bit patterns of a portion of the ACK-NACK feedback message of FIG. 6 according to embodiments of the present invention.

Exemplary bit patterns for the p bits in Part-1 540 of the ACK-NACK feedback are shown in FIG. 7. In the embodiment shown in FIG. 7, Part-1 540 of the ACK-NACK feedback includes two bits (p=2), which enables the receiver to individually request retransmission of up to two code words received in error. If three or more code words are received in error, the transmitter will need to retransmit all of the code words in the transport block. In the example shown in FIG. 7, if the receiver receives all the code words without any error, the Part-1 feedback 540 is set to {00}. If one of the code words is received in error, the Part-1 feedback 540 is set to {01}. If two code words are received in error, the Part 1 feedback 540 is set to {10}. Otherwise, the Part-1 feedback 540 is set to {11}, indicating that the transmitter has to retransmit all of the code words in the transport block.

The number of code words received in error should typically be less than or equal to 2 due to the link adaptation scheduling. For example, typically, the link adaptation scheduling is done such that the transport block's PER is approximately 10-20% (average of 15%). Assuming the error pattern across code words is independent, with n code words, the per code word's error rate is approximately (15/n) %=(0.15/n). Therefore, with n code words, the average number of code words in error is given by n*(0.15/n)=0.15. As a result, the number of code words in error in a transport block is typically less than or equal to 2.

Referring now to FIGS. 6 and 7, with Part-1 540 including two bits, the number of bits in Part-2 (q bits) 550 is variable and can be derived based on number of code words in error and the total number of code words in a transport block. This mapping can be decided up front between transmitter and receiver, as discussed above in connection with FIG. 5. The transmitter, based on the information decoded from Part-1 540, can then determine q (size of Part-2 550), as well as the information in Part-2 550. For example, if the total number of code words is 4, q can be set to 2 bits if the number of code words in error is 1, and can be set to 3 bits if the number of code words in error is 2. Regardless of the total number of code words, if the number of code words in error is 0, then q can be set to 0 bits.

In an exemplary embodiment, when the number of code words within a transport block is less than or equal to 64, with Part-1 540 including two bits, Part-2 550 can include 6 bits (q=6) to identify the particular code word(s) received in error.

In an exemplary scenario, if the number of code words in a transport block is less than or equal to 64 and greater than 11, and no code words are received in error, Part-1 540 can be set to {00}, while Part-2 550 is not transmitted (or blank). If one code word is received in error, Part-1 540 can be set to {01}, and Part-2 550 can be appropriately set to indicate which code word was received in error. However, if more than one code word is received in error, Part-1 540 can be set to {11}, while Part-2 550 is not transmitted (or blank).

In another exemplary scenario, if the number of code words in a transport block is less than or equal to 11, and no code words are received in error, Part-1 540 can be set to {00}, while Part-2 550 is not transmitted (or blank). If one code word is received in error, Part-1 540 can be set to IOU, and Part-2 550 can be appropriately set to indicate which code word was received in error. If two code words are received in error, Part-1 540 can be set to {10}, and Part-2 550 can be appropriately set to indicate which two code words were received in error. However, if more than two code words are received in error, Part-1 540 can be set to {11}, while Part-2 550 is not transmitted (or blank).

As evident from the above scenarios, the maximum benefit occurs when the total number of code words in a transport block is less than or equal to 11. In an LTE wireless communication system, 11 code words per transport block corresponds to at least 4.2 bits/sec/Hz. In a fading environment, the SNR required to support such a spectral efficiency is approximately 22 dB. Evidence has shown that at least 80% of wireless cellular network locations/times experience an SNR less than or equal to 22 dB. Therefore, in at least 80% of locations and at least 80% of the time, the exemplary feedback mechanism discussed above is fully efficient.

It should be noted that in embodiments in which the number of code words in a transport block is greater than 64, the two-part ACK-NACK feedback can still be used. For example, if the number of code words in a transport block is greater than 64, and all code words were received without error at the receiver, Part-1 540 can be set to {00}, while Part-2 550 is not transmitted (or blank). If at least one code word was received in error, Part-1 540 can be set to {11}, indicating that all code words in the transport block should be retransmitted, while Part-2 550 is not transmitted (or blank).

It should be understood that the number of p bits 540 and q bits 550 is variable, and embodiments of the present invention should not be limited to any particular number of bits. In addition, it should be understood that the number of p bits 540 and q bits 550 can be predetermined, set during the initial data scheduling between the transmitter and receiver and/or dynamically adjusted in real-time during a communication session between the transmitter and receiver based on network conditions or other factors.

Figure 8:
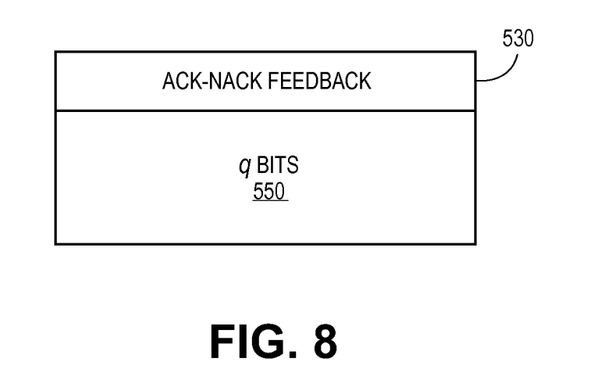
FIG. 8 illustrates another exemplary format of an ACK-NACK feedback message according to embodiments of the present invention.

Turning now to FIG. 8, in another embodiment, the ACK-NACK feedback 530 sent from the receiver to the transmitter includes only q bits 550, which are used by the transmitter to determine which code words were received in error. For example, each code word can be represented by one of the q bits to indicate whether that code word was received in error or not. In an exemplary embodiment, the q bits 550 are strongly coded to ensure that the bits are received at the transmitter without error to prevent packet loss. In another exemplary embodiment, the q bits 550 are weakly coded to utilize less bandwidth. However, in this embodiment, the possibility of packet loss is greater.

Figure 9:
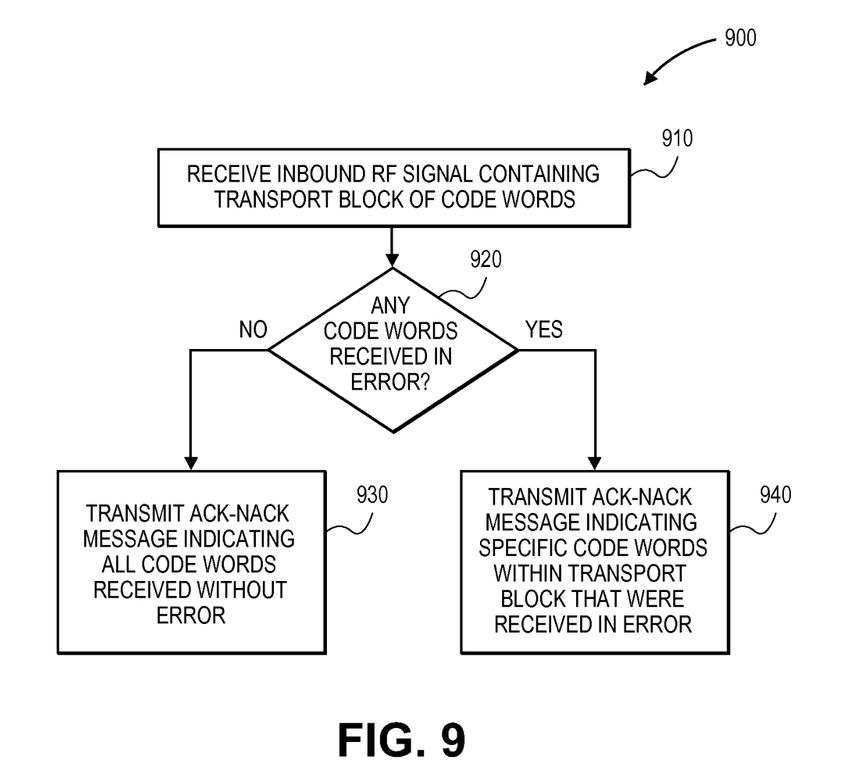
FIG. 9 illustrates an exemplary ACK-NACK signaling method according to embodiments of the present invention.

FIG. 9 illustrates an exemplary ACK-NACK signaling method 900 according to embodiments of the present invention. At 910, an inbound RF signal containing a transport block of code words is received at a wireless terminal. At 920, a determination is made whether any of the code words were received in error. If not, at 930, the wireless terminal transmits back to the source of the RF signal an ACK-NACK message indicating that all code words were received without error. If so, at 940, the wireless terminal transmits back to the source of the RF signal an ACK-NACK message indicating the specific code words within the transport block that were received in error.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus, comprising:
 a transmitter configured to transmit an outbound Radio Frequency (RF)signal to a destination device, the outbound RF signal including a plurality of code words forming a transport block;
 a receiver configured to receive an Acknowledgement-Negative Acknowledgement (ACK-NACK) message from the destination device, wherein when one or more of the code words within the transport block were received in error by the destination device, the ACK-NACK message indicating the one or more of the code words that were received in error; and
 a processing module configured to determine the one or more of the code words that were received in error from the ACK-NACK message and retransmit the one or more of the code words that were received in error to the destination device via the transmitter.

2. The apparatus of claim 1, wherein the ACK-NACK message includes a first part indicating a number of code words received in error and a second part indicating the one or more of the code words that were received in error.

3. The apparatus of claim 2, wherein bits in the first part are coded more strongly than bits in the second part.

4. The apparatus of claim 2, wherein a number of bits in at least one of the first part and the second part is variable based on a number of code words in the transport block and the number of code words received in error.

5. The apparatus of claim 4, wherein the number of bits in at least one of the first part and the second part is dynamically adjusted in real-time.

6. The apparatus of claim 2, wherein a number of bits in the first part is two.

7. The apparatus of claim 6, wherein a number of bits in the second part is zero when one or more of all of the code words in the transport block were received without error or more than two code words are received in error.

8. The apparatus of claim 6, wherein a number of bits in the second part is six when at least one of the code words is received in error.

9. The apparatus of claim 1, wherein the ACK-NACK message includes one bit for each code word in the transport block.

10. The apparatus of claim 1, wherein the processing module is further configured to determine a format of the ACK-NACK message to be used by the destination device and to transmit control information including the format of the ACK-NACK message to the destination device via the transmitter.

11. An apparatus, comprising:
 a transmitter configured to transmit an outbound Radio Frequency (RF) signal to a destination device, the outbound RF signal including a plurality of code words forming a transport block;
 a receiver configured to receive an Acknowledgement-Negative Acknowledgement (ACK-NACK) message from the destination device, the ACK-NACK message having a variable format based on a number of code words in the transport block and a number of code words received in error by the destination device, wherein when one or more of the code words within the transport block were received in error by the destination device, the ACK-NACK message indicating the one or more of the code words that were received in error; and
 a processing module configured to determine the one or more of the code words that were received in error from the ACK-NACK message and retransmit the one or more of the code words that were received in error to the destination device via the transmitter.

12. The apparatus of claim 11, wherein the ACK-NACK message includes a first part indicating the number of code words received in error and a second part indicating the one or more of the code words that were received in error.

13. The apparatus of claim 12, wherein bits in the first part are coded more strongly than bits in the second part.

14. The apparatus of claim 12, wherein a number of bits in at least one of the first part and the second part is variable based on the number of code words in the transport block and the number of code words received in error.

15. The apparatus of claim 14, wherein the number of bits in at least one of the first part and the second part is dynamically adjusted in real-time.

16. The apparatus of claim 12, wherein a number of bits in the first part is two.

17. The apparatus of claim 16, wherein a number of bits in the second part is zero when one or more of all of the code words in the transport block were received without error or more than two code words are received in error.

18. The apparatus of claim 16, wherein a number of bits in the second part is six when at least one of the code words is received in error.

19. A method for Acknowledgement-Negative Acknowledgement (ACK-NACK) signaling, comprising:
 transmitting an outbound Radio Frequency (RF) signal to a destination device, the outbound RF signal including a plurality of code words forming a transport block;
 receiving an Acknowledgement-Negative Acknowledgement (ACK-NACK) message from the destination device, wherein when one or more of the code words within the transport block were received in error by the destination device, the ACK-NACK message indicating the one or more of the code words that were received in error;
 determining the one or more of the code words that were received in error from the ACK-NACK message; and
 retransmitting the one or more of the code words that were received in error to the destination device.

20. The method of claim 19, wherein the ACK-NACK message includes a first part indicating a number of code words received in error and a second part indicating the one or more of the code words that were received in error, a number of bits in at least one of the first part and the second part being variable based on a number of code words in the transport block and the number of code words received in error.

* * * * *